9501X
C. RICHARDSON.
FORGE BACK.
Patented Mar. 12, 1836.
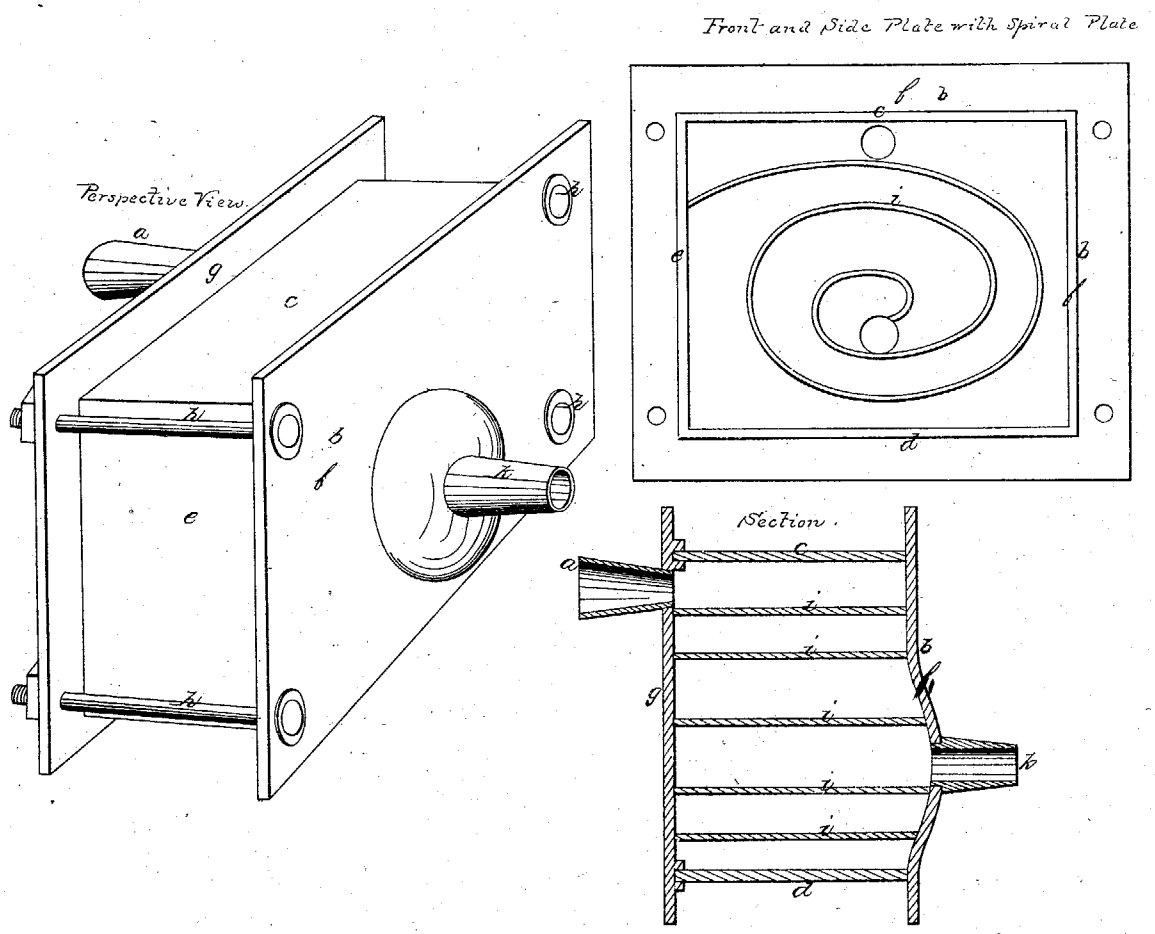

9501X

Mar. 12, 1836

Charles Richardson of Greenfield New Hampshire

Letters Patent.

The Schedule referred to in these Letters Patent and making part of the same containing a description in the words of the said Charles Richardson himself of his improvement in Blacksmiths Cast Iron hollow forge backs.

To all to whom these presents shall come

Be it known that I Charles Richardson, of Greenfield in the County of Hillsboro and State of New Hampshire have invented a new and useful improvement in the mode of constructing Blacksmiths cast Iron Forge Backs and furnace backs for the purpose of blowing heated air upon the coal and likewise for the great durability over other ~~other~~ forge backs heretofore in use and that the following is a full and exact description thereof. The forge back consists of a square or oblong box or air chamber, in the upper part of the backside of which the bellows nose is inserted through a round hole in the back plate of the box, and the air after making one or more evolutions round the outer part of the box, escapes through a round aperture in the front towards the bottom of the box in a heated state directly upon the coal thereby heating the coal faster But making a more mild and mellow heat, adapted to taking sound welds and not burning the iron so much as by Blacksmiths common back. The front part of the box .. towards the lower part around the aperture is considerably swelled out or convex, in order to its greater durability where the heat is intense. The front, sides, top and bottom of the box are cast in one piece The front plate being about twelve inches square and about seven eighths of an inch thick and the top sides and bottom being horizontally about four inches deep and about three eighths of an inch thick and about nine inches across from side to side ~~to side~~ and from top to bottom, and the top bottom and side are cast to the front plate at equal distance from each of its four edges the back plate is cast separately with a flange or projection near the edge of which shuts tightly upon the outside of the sides top and bottom. and is fastened closely to
the box by four wrought iron bolts, which pass from the four corners
of the front plate through the four corners of the back plate and are
fasten'd with screws at the ends opposite to the heads. In the in
side of the box and connected with the front and left hand side is a
thin wide spiral plate of cast iron connected with the left hand
side and front of the box just below the hole in the back plate
and proceeding from the left hand side towards the right, and descri
bing a curve downwards in such a manner that the air in coming
into the box through the hole in the back above this spiral plate.
will describe a circle to the right around the outer part of the box,
going about once round the box in order to obtain a proper degree of
heat through the front and sides of the box, and after having de
scribed the curve the spiral plate ends near the hole in the front
part so that the air may escape through the hole upon the coal.
This spiral piece of cast iron fills up the box from the front to the
back piece and may be made quite thin, as there is not great stra[in]
upon it, and it will not be heated much more than the air is as
it escapes in front. In order to make it perfectly air tight so that
no air shall escape over the edge of this spiral plate of cast iron
but shall follow around to the right about the circumference of the
box as before described, Lime, plaster of Paris or other cement m[ay]
be used to fill up any crevices or cracks that might remain on
the edge of the spiral plate or round the edges in contact with the bac[k]
plate to the box. What I claim as my own invention and
not previously known in the above described machine is the above
described spiral plate of cast iron and the peculiar form and
size of the swelled front or concave part of the front part of the
box as applied to the hollow forge backs Witnesses
Albert Richardson
Cyrus Richardson Charles Richardson

[illegible]d.
1196

(762 words)